Nov. 21, 1950     A. V. HOEFFLEUR     2,530,660
BEARING
Filed July 26, 1946
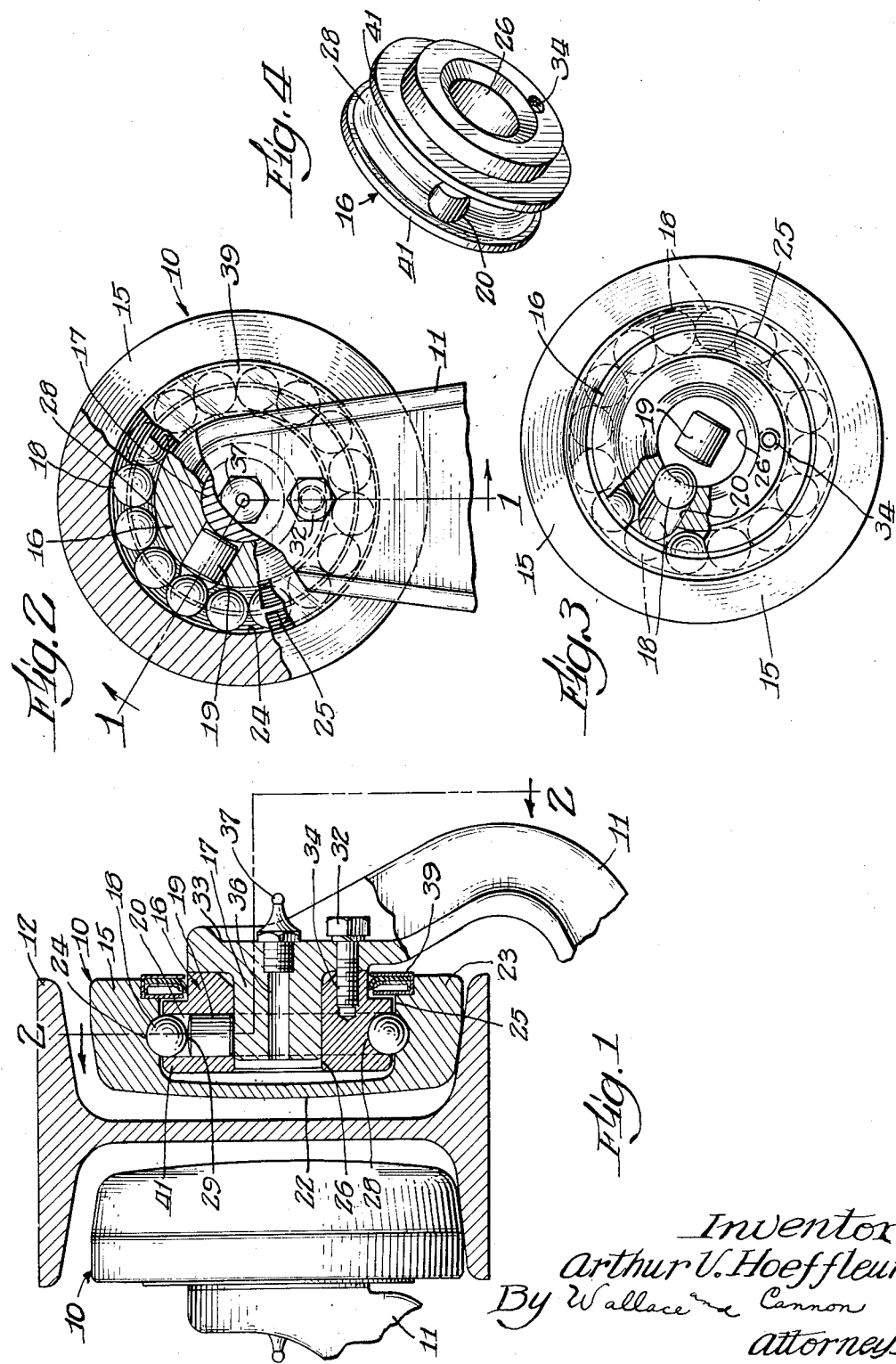

Patented Nov. 21, 1950

2,530,660

UNITED STATES PATENT OFFICE 2,530,660

BEARING

Arthur V. Hoeffleur, Chicago, Ill., assignor to Conveyor Systems, Inc., Chicago, Ill., a corporation of Illinois Application July 26, 1946, Serial No. 686,314

2 Claims. (Cl. 308—198)

This invention relates to bearings and more particularly to that type of bearing commonly referred to in the art as ball bearings.

The primary object of my invention is to provide a quietly operating and economically constructed ball bearing which will give efficient service for a long period of time.

Ball bearings are so constructed that it is important to their maintenance and service that they be kept properly lubricated and that foreign particles such as dirt, sand, or other grit be kept out of their working parts. In this connection, it is an object of my invention to construct a ball bearing wherein the elements thereof are of such a nature and are associated in such a manner that they provide improved sealing over anything heretofore known to the art against the entry of foreign particles into the bearing.

In the ball bearings heretofore known to the art, the inner and outer races were usually spaced from each other throughout the entire length thereof so that in order to protect the interior of the bearing against the entry of foreign particles, it was necessary to attach individual sealing elements at each end of the bearing. The employment of individual sealing elements at both ends of a bearing is undesirable for two primary reasons, among others, the first of which is that such seals are not perfect and under certain conditions will allow foreign particles to get by; and the second is that from a manufacturing and production standpoint the employment of a number of separate elements which must be assembled is undesirable. In this connection, it is an object of my invention to construct a ball bearing wherein the outer race is constructed in a substantially cup-shaped form so that one end is solid and thereby assures complete and positive sealing against the entry of foreign particles into the bearing from that end without employing a separate sealing element.

An object ancillary to the foregoing objects is to construct a ball bearing wherein the lubricant is retained therein in an improved manner.

It is a further object of my invention to construct a ball bearing wherein the races and the balls therebetween are associated with each other in an improved manner.

Another object of my invention is to construct a ball bearing wherein the balls thereof retain the inner and outer races in operative position relative to each other.

Another object of my invention is to construct a ball bearing wherein the balls may be inserted between the races after the races have been placed in assembled position relative to each other.

A further object of my invention is to construct a ball bearing wherein during assembly, or disassembly, of the bearing the balls thereof are inserted into, or removed from, operative position between the outer and inner race through a substantially radially extending opening in the inner race.

Yet another object of my invention is to construct a ball bearing wherein the balls are associated with the races in such a manner that each of the center peripheral portions of the ball are in contact with the walls of one raceway only.

Other and further objects of the present invention will be apparent from the following description and claims and are illustrated in the accompanying drawing which, by way of illustration, shows a preferred embodiment of the present invention and the principle thereof and which I now consider to be the best mode in which I have contemplated applying that principle. Other embodiments of the invention embodying the same or equivalent principles may be used and structural changes may be made as desired by those skilled in the art without departing from the present invention and the purview of the appended claims.

In the drawings:

Fig. 1 is a front view of my invention illustrating how it may be used on one type of overhead conveyor trolley or the like, and showing two of my bearings, the view of one of the bearings being in elevation and the other being in section;

Fig. 2 is a view taken substantially along the line 2—2 in Fig. 1 and is partly in section and partly in side elevation;

Fig. 3 is a side elevational view similar to Fig. 2 and illustrates one of the later steps in the assembly of my bearing; and Fig. 4 is a detail perspective view of the inner race used in my bearing.

My bearing 10 is shown in the accompanying drawing as it would appear when used in an overhead trolley or conveyor system wherein the bearing 10 constitutes a wheel used to roll supporting arms or brackets 11 along a track 12. It will be understood that the lower ends of the conveyor brackets 11 may be connected to a supporting device or may be connected together (not shown) below the track 12 and a supporting hook or other supporting device attached thereto or carried thereby in any one of several manners which are well known in the art.

As will be more fully discussed hereinafter, my bearing 10 comprises as the principal elements thereof, a wheel or outer race 15, an inner race 16, a hub 17, balls 18 interposed between the outer race 15 and the inner race 16, and a plug or retaining member 19 positioned in an opening 20 formed in the inner race 16 and retained therein by the hub 17 to thereby close the opening 20 and maintain the balls 18 in position between the outer race 15 and the inner race 16.

It will be noted that the outer race 15 is substantially cup shaped in form having a substantially disk shaped solid side wall 22 and a flange 23 projecting laterally from the peripheral edge thereof.

A groove 24 is formed on the inner face 25 of the flange 23 and forms the outer raceway for the balls 18.

The inner race 16 has an opening 26 extending through the center thereof and has a groove 28 formed on its outer peripheral edge portion and which provides the inner raceway for the balls 18. The opening 20 formed in the inner race 16 extends substantially radially from the center hole 26 provided therein to the groove or inner raceway 28, and is of a size slightly greater than that of the balls 18 so that, as will be presently described in greater detail, in assembling my bearing the balls 18 may be inserted from the center of the bearing 10 into the space between the outer race 15 and the inner race 16 through the opening 20.

In assembling my bearing 10 the inner race 16 is inserted into the outer race 15 and the balls 18 are then fed one at a time from the center opening 26 through the opening 20 into the space between the outer raceway 24 formed in the outer race 15 and the inner raceway 26 formed in the inner race 16. After each ball 18 is inserted through the opening 20 into the space between the raceways 24 and 28, the races 15 and 16 may be rotated or oscillated slightly with respect to each other so that the inserted balls are moved out of registration with the opening 20, at which time another ball 18 may be inserted. This operation is repeated until the space between the raceway 24 and 28 is completely filled with balls 18. When the last ball 18 is inserted into the space between the raceway 24 and 28, the plug or retaining member 19 is inserted into the opening 20, and the hub 17 is inserted into the opening 26 to thereby hold the retaining plug 19 in position, and thereby perfect the enclosing of the balls 18 in operating position between the raceways 24 and 28.

After the hub 17 is inserted in the opening 26 of the inner race 16 it may be retained therein in any suitable manner such as, for example, by inserting a screw 32 through the flange 33 of the hub 17 and screwing it into threaded engagement with an opening 34 formed in the inner race 16.

The plug 19 is of such length that when it is held in position in the opening 20 by the hub 17, the outer end portion 29 thereof is substantially flush with, and forms a smooth extension of the inner bearing surface of the inner raceway 28 so that during the operation of my bearing the balls 18 are not subjected to any appreciable shock or pounding when they roll over the plug 19.

To further insure that the balls 18 will not be subjected to any appreciable shock or pounding as they roll over the plug 19, it is desirable that the plug 19 be positioned out of the principal lines of thrust to which the bearing is subjected. This may be accomplished by properly positioning the inner race 16 with respect to the hub 17 before securing it thereto. Thus, for example, as illustrated in Fig. 2, in an instance where the principal thrust on the inner race 16 is substantially vertical in an upward direction, the plug 19 should preferably be positioned above the horizontal center line of the bearing 10 and at an angle to the vertical so that when the balls 18 roll over the plug 19 there is no appreciable load thereon.

As best seen in Fig. 1, an opening 36 extends axially through the hub 17, and a grease gun fitting, or nipple 37, is threaded into the outer end portion thereof, so that grease may be forced through the opening 36 into the space between the outer race 15 and the inner race 16 to thereby provide lubrication between the two races and between the balls 18 and the races. A grease retainer or wiper ring 39 of a type which is well known to the art is carried by the outer race 15 in a manner which is well-known to the art and seals the space between the outer race 15 and the inner race 16 on the face of the bearing opposite the side wall 22 thereof. This retaining ring 39 provides both a member which guards against leakage of lubricant from between the outer race 15 and the inner race 16, and a member which guards against the entry of foreign particles of matter therebetween.

It will be noted that the vertical walls 41 of the inner raceway 28 extend a distance from the base of the inner raceway 28 which is greater than the radius of the individual balls 18. The side walls 41 are constructed in this manner so that the center portions of the balls against which the greatest horizontal thrust will be applied is in engagement with a flat surface. Also, in this connection, it will be noted that the opening 20 formed in the inner race 16 terminates at a point below the outer edge portion of the edges 41 of the raceway 28 so that the side walls 41 of the raceway 28 form an unbroken substantially flat engaging surface for the center portions of the periphery of the balls 18, and therefore, the balls ride smoothly along the walls of the raceway 28 throughout the entire length thereof, and even over the opening 20 and the plug 19.

From the foregoing it will be noted that I have provided a novel and practical bearing which is assembled in a novel and practical manner, and when so assembled, provides a bearing which is well sealed against the leakage of lubricant and against the entry of dirt and other foreign matter thereinto.

Also it will be noted that I have provided a ball-bearing wherein the balls ride smoothly over the surfaces of the inner and outer races, and wherein if it is desired or found necessary so to do, balls may be quickly and easily replaced.

Also it will be noted that the present invention accomplishes its intended objects, some of which have been specifically referred to hereinbefore, and others of which will be apparent from the foregoing description taken in conjunction with the accompanying drawings.

Hence, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. A trolley comprising a wheel including a solid side and a flange protruding from the peripheral edge portion thereof, said flange having an annular raceway provided in the central inner periphery thereof and an internal shoulder adjacent the outer face of the flange, an inner member positioned within said flange in closely spaced relation thereto and co-axial therewith, said inner member having an annular raceway provided in the outer periphery thereof, the outer portion of said member having a shoulder thereon, the surface of which is in substantial alignment with the surface of the shoulder on the flange, the said surfaces cooperating with the respective adjacent peripheral surfaces of the flange and the inner member to define an annular recess for the reception of a sealing member, balls positioned in operative engagement with said raceways between said outer and inner members, said raceway in said inner member being of sufficient depth that the sidewalls thereof extend beyond the centers of said balls when said balls are in operative engagement with said raceway, said inner member having a substantially radially extending passage formed therein through which balls may be inserted into said raceways, a sealing member in the annular recess and in engagement with said outer and inner members at the side edge portions thereof opposite said solid side wall, a plug positioned in said passage and adapted to retain said balls in said raceways, a supporting bracket including an arm and a hub member extending substantially perpendicularly thereto, said hub member extending into said inner member coaxially therewith, the outer periphery of said hub member being in engagement with one end of said plug, means attaching said supporting bracket to said inner member, and the said passage being disposed at an angle with respect to a vertical plane bisecting the axes of the hub and the said attaching means and the bracket and which angle is above the horizontal axis of the hub when the wheel is disposed vertically so that pounding of the balls on the plug in the passage is minimized.

2. A trolley comprising a dish-shaped outer member having an outwardly extending annular flange, the outer surface of which constitutes the rolling surface of the trolley and the inner peripheral surface of which is provided with an annular groove defining a raceway which raceway is disposed substantially centrally of the inner periphery of the flange, the said flange having an internal shoulder formed thereon adjacent the outer face thereof, an axially bored solid body disposed coaxially within the said flange, said body having an annular groove formed therein and which groove defines an inner raceway, the peripheral surface of the body having a turned-down portion which cooperates with the shoulder formed on the flange to define an annular recess for the reception of a sealing member, said body having a radial passage extending therethrough which communicates at one end with the base of the groove and at its other end with the axial bore, balls disposed within and between the raceways, the balls being insertible through the passage, the depth of the raceway in the said body being such that the side walls thereof extend beyond the centers of the balls when the balls are in operative engagement with the raceways, a plug disposed within the passage, the outer end of said plug having a surface forming a continuation of the inner raceway, said plug retaining the balls within the confines of the raceway, the annular peripheral surface of the body being disposed in close juxtaposition to the inner peripheral surfaces of the flange, a sealing member disposed within said annular recess, a support bracket including an arm and a hub member extending perpendicularly thereto, said hub member being disposed within the bore of the body, said body having a threaded recess in the outer face thereof and said arm having an aperture extending therethrough adjacent the hub and in annular registry with the threaded recess in the body so that the respective aperture and recess may be placed in alignment, a threaded bolt passing through the aperture and engaging the threads of the recess to secure the support bracket to the body, with the said passage disposed at an angle with respect to a vertical plane bisecting the axes of the hub and the bolt and the arm and which passage is above a horizontal plane passing through the hub when the wheel is disposed vertically with the support bracket depending therefrom so that pounding of the balls on the plug in the passage is minimized.

ARTHUR V. HOEFFLEUR.

REFERENCES CITED

The following references are of record in the file of this patent:

UNITED STATES PATENTS

| Number | Name | Date |
|---|---|---|
| 596,678 | Heath | Jan. 4, 1898 |
| 1,896,978 | Hele-Shaw | Feb. 7, 1933 |
| 1,905,079 | Wellensick | Apr. 25, 1933 |
| 2,210,077 | Hanly | Aug. 6, 1940 |
| 2,250,167 | Niles et al. | July 22, 1941 |
| 2,283,312 | Boice | May 19, 1942 |
| 2,333,867 | Kucho | Nov. 9, 1943 |